United States Patent [19]

Lanham

[11] Patent Number: 4,997,365
[45] Date of Patent: Mar. 5, 1991

[54] SPIRAL CONVEYOR BAKING APPARATUS

[75] Inventor: William E. Lanham, Conyers, Ga.

[73] Assignee: APV Baker Inc., Atlanta, Ga.

[21] Appl. No.: 468,756

[22] Filed: Jan. 23, 1990

[51] Int. Cl.⁵ .................... F27B 9/16; B65G 21/18
[52] U.S. Cl. .................................. 432/121; 34/147; 34/207; 198/778
[58] Field of Search .................... 432/11, 121, 133; 198/778, 831; 34/207, 147; 126/21 A; 99/365, 443 C

[56] References Cited

U.S. PATENT DOCUMENTS

| | | | |
|---|---|---|---|
| 1,445,196 | 2/1923 | Berry | 99/365 X |
| 1,837,502 | 12/1931 | Thompson | 99/365 X |
| 3,348,659 | 10/1967 | Roinestad | 34/147 X |
| 3,536,183 | 10/1970 | Locke | 198/778 |
| 3,666,083 | 5/1972 | Smith | 198/778 |
| 3,680,493 | 8/1972 | Lanham et al. | 34/147 X |
| 3,865,227 | 2/1975 | Kaak | 198/778 X |
| 4,201,288 | 5/1980 | van Capelleveen | 198/778 |
| 4,514,167 | 4/1985 | Royer | 432/11 |
| 4,544,352 | 10/1985 | Lanham et al. | 34/207 X |
| 4,608,961 | 9/1986 | Lanham, Jr. et al. | 126/21 A |
| 4,636,366 | 1/1987 | Langen | 99/362 X |
| 4,726,766 | 2/1988 | Stewart et al. | 432/133 |
| 4,792,303 | 12/1988 | Stewart et al. | 432/133 X |

Primary Examiner—Henry A. Bennet
Assistant Examiner—C. Kilner
Attorney, Agent, or Firm—Pasquale A. Razzano

[57] ABSTRACT

A food processing apparatus is disclosed which includes a food conditioning enclosure having opposed end and side portions, with conveyor inlet and outlet openings formed therein. An endless conveyor is provided which includes a first section located outside of the enclosure with portions thereof passing through the inlet and outlet openings. The conveyor includes a second main portion located within the enclosure which follows a generally spiral path of travel including a first sequential set of spiral flights having a generally continuously increasing elevation rising in the enclosure to a predetermined elevation, a second set of spiral flights having a generally continuously decreasing elevation in the enclosure, with the flights of said second set being located between the flights of the first set. A straight conveyor section connects the first and second flights at the uppermost elevations of the first and second sets of flights and crosses from one side of the enclosure to the other, whereby the position of pans on the conveyor relative to the sides of the conveyor are reversed during travel in the riser and declining sections of the conveyor.

12 Claims, 3 Drawing Sheets

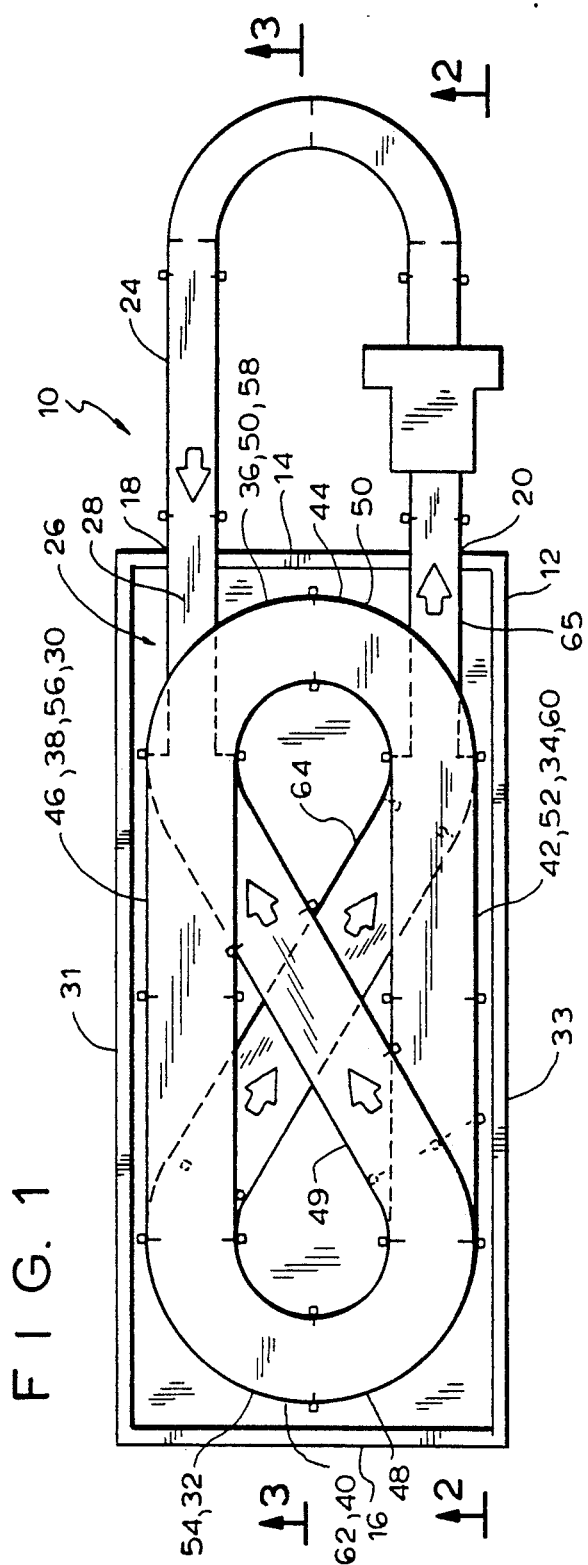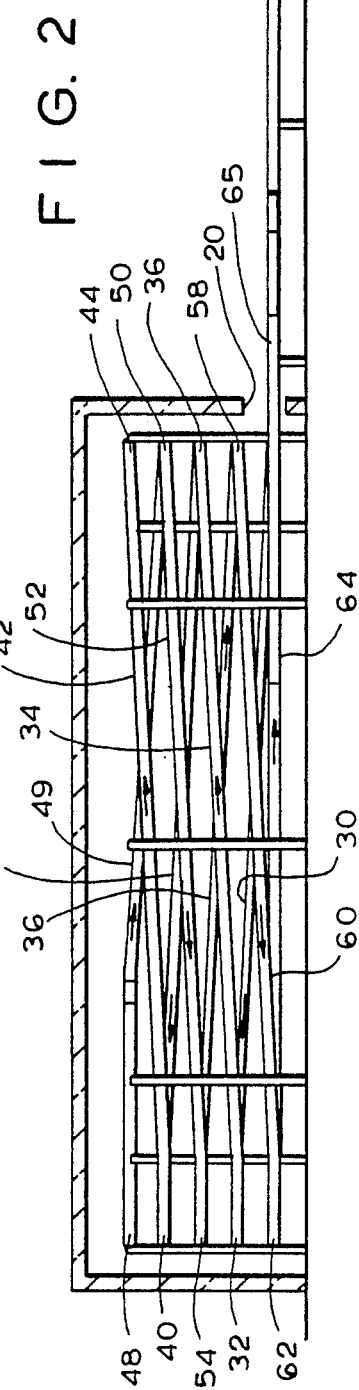

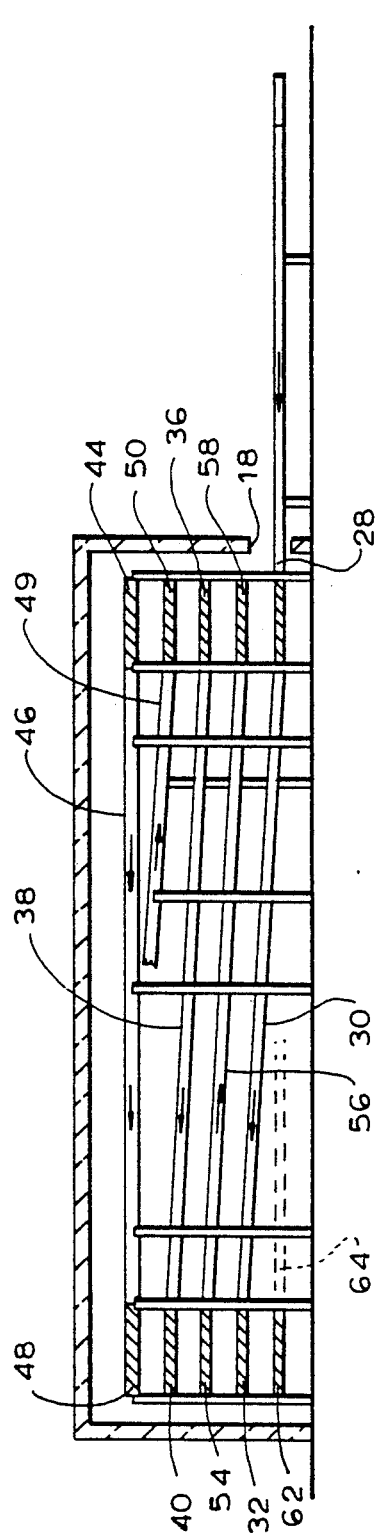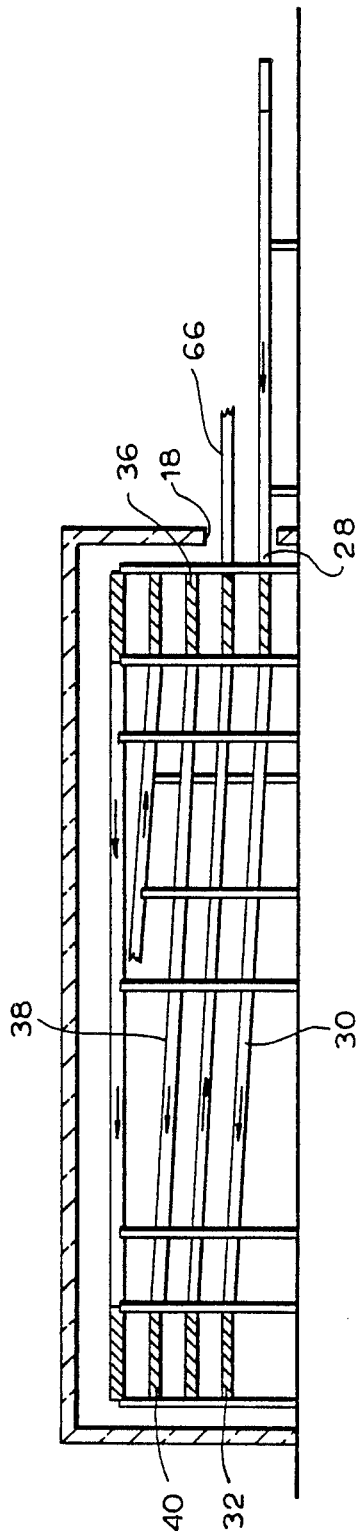

SPIRAL CONVEYOR BAKING APPARATUS

The present invention relates to commercial bakery ovens, and more particularly to an improved conveyor arrangement for handling bakery products.

BACKGROUND OF THE INVENTION

In modern bakery operations, conveyorized ovens are utilized for baking bread and other dough products in order to transport the bakery products through the oven, and other components of the bakery, on a continuous basis to produce the bakery product. The conveyor may be one single continuous conveyor extending through all of the bakery operations, or it can be a series of conveyors within each separate operation, with an intermediate conveyor for transferring pans from one operation to another. For example, there may be a single continuous conveyor for the oven and another single separate conveyor for the proofer.

In previously proposed bakery operations the conveyors, particularly in an oven, have taken a variety of forms. For example, it has previously been proposed to provide circular conveyors, as well as spiral conveyors. Typically, these conveyors extend along the periphery of the interior oven space through several flights in a circular or generally rectangular path of travel. Such conveyors are disclosed, for example in U.S. Pat. Nos. 3,680,493; 4,726,766; and 4,514,167. As seen in these patents, such ovens require a substantial amount of space with a substantial portion of the interior of the oven vacant, since the conveyor primarily resides along the periphery of the oven.

In U.S. Pat. No. 4,726,766, the conveyor follows an interior and exterior spiral path, which utilizes the interior space of the oven more completely, but which is complex to construct.

It is an object of the present invention to provide an improved conveyor system for food processing.

In particular, it is an object of the present invention to provide an improved conveyor for a bakery oven, although the conveyor system is adaptable to other food processing operations, including, for example, a bakery proofer.

Yet another object of the present invention is to provide an improved conveyor and conveyor system.

A further object of the present invention is to provide a conveyor system of the type described herein which is efficient and dependable in operation.

Yet another object of the present invention is to provide an improved conveyor system for bakery products which avoids the drawbacks of the prior art.

Yet another object of the present invention is to provide a bakery oven construction in which the bakery products are subjected to substantially uniform baking conditions in the course of their journey through the oven.

SUMMARY OF THE INVENTION

The present invention describes a unique conveyor system for transporting bakery pans or the like through an oven. In one embodiment of the invention the conveyor is adapted to enter and exit the oven enclosure through inlet and outlet openings which are located at the same height and at the same side of the enclosure.

The conveyor system of the present invention follows a generally spiral path within the oven but defines at least one cross over, S-shaped, path of travel within the oven. One set of flights of the conveyor leading from the inlet port follow a generally continuously rising path of travel to a predetermined height and then crosses over to the opposite side of the oven in a FIG. 8 type pattern to a second set of flights, which follow a generally descending path of travel. The ascending and descending flights are alternated between one another. When the conveyor reaches its lowermost position in the descending flights it passes to the outlet opening in the oven housing.

By this construction, all of the bread pans pass through the entire oven and are all subjected to the same conditions throughout the oven. In particular, the pans follow essentially the same path of travel in the rising section of the oven as in the descending section of the oven, but their position in the two sections relative to each other is changed by 180°, thus assuring a more uniform bake to occur for the products on the tray.

The above, and other objects, features and advantages of this invention will be more fully understood from the ensuing detailed description of a preferred embodiment thereof which is to be read in connection with the accompanying drawings, wherein.

DESCRIPTION OF THE DRAWINGS

FIG. 1 is a plan view of a conveyor system constructed in accordance with the present invention;

FIG. 2 is a side elevational view, taken along line 2—2 of FIG. 1;

FIG. 3 is a view similar to FIG. 2, but taken along line 3—3 of FIG. 1;

FIG. 5 is a sectional view similar to FIG. 2, illustrating another embodiment of the invention.

Figure 4:
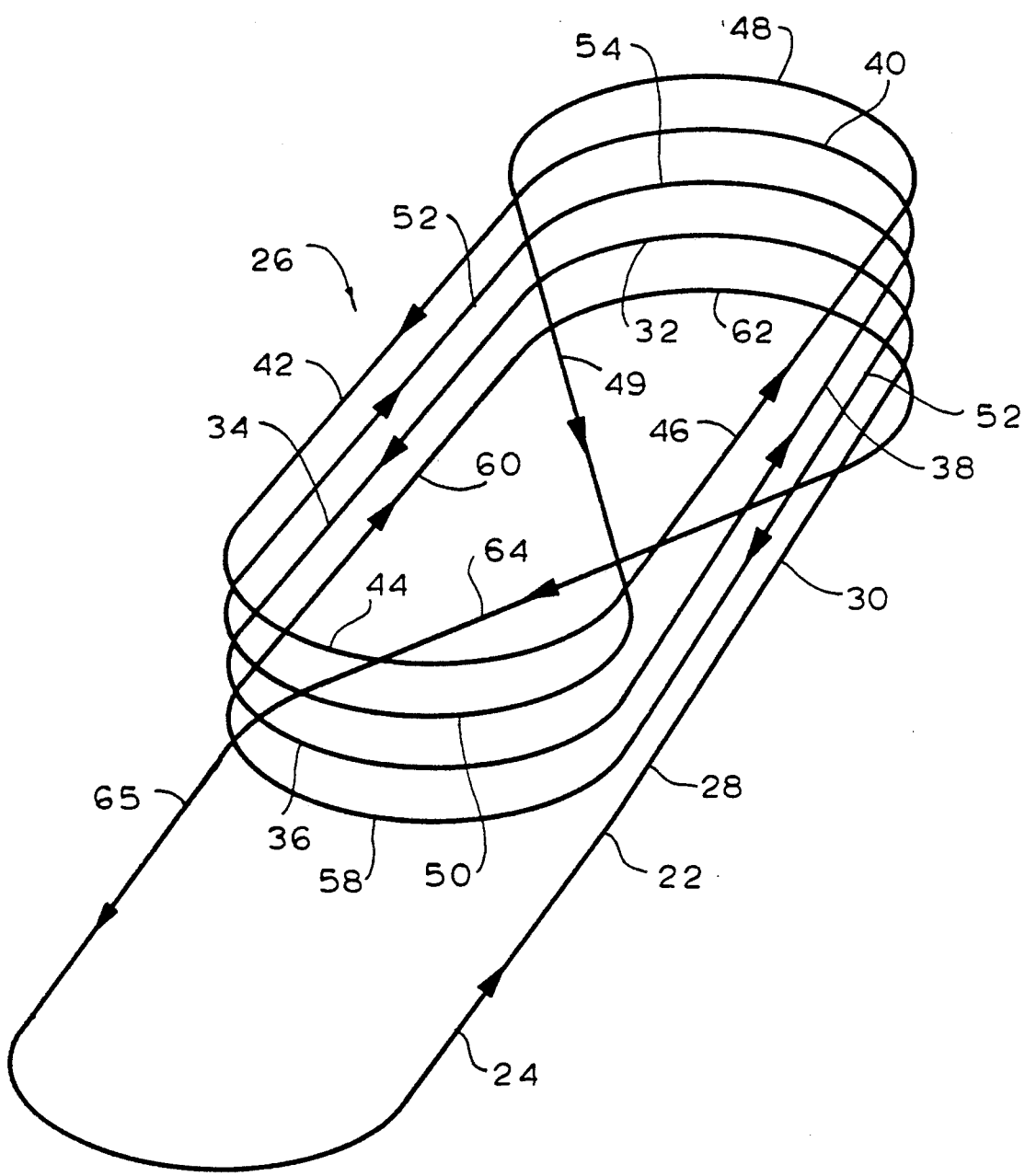
FIG. 4 is a schematic perspective view of the path of travel followed by the conveyor of FIGS. 1-3.

Referring now to the drawings in detail, and initially to FIGS. 1 and 4, a conveyor system 10 constructed in accordance with the present invention is illustrated. The conveyor system 10 is particularly adapted for use in connection with a bakery oven, although it can be suitably adapted for use in connection with a proofer or other food processing enclosure. The oven 12 used in connection with conveyor 10 is a relatively large rectangular enclosure, of generally conventional construction, as is well known to those skilled in the art. In the illustrated embodiment, the conveyor has opposed end walls 14, 16, with end wall 14 having openings or ports 18, 20 formed therein. The port 18 defines an inlet opening for the conveyor and the port 20 defines an outlet opening.

The conveyor 22 of the present invention may be constructed as a center drive chain conveyor supporting a plurality of wire grids, such as is disclosed, for example, in U.S. Pat. No. 3,680,493. The disclosure of such patent is incorporated herein by reference.

As the specific construction of the center chain drive conveyor is known in the art, it is not described herein in detail. The principal feature of the present invention is the path of travel followed by the conveyor in accordance with the present invention.

In particular, conveyor 22 is an endless conveyor constructed as described in the '493 patent, which has a first section 24 located outside of the enclosure 12 and a second section 26 located within the enclosure. The first section 24 may follow any convenient path of travel as is necessary within the particular bakery environment in which it is used. This section will include a conveyor take-up, as is conventional in the art, and perhaps a conveyor cleaning unit, as well as pan supply and discharge stations, at which pans filled with raw dough are supplied to the conveyor for transport into the oven and at which the pans containing the baked goods are removed from the oven.

Conveyor 22 includes an inlet section 28 which passes through the inlet opening 20 into the oven interior. Shortly after entering the oven interior adjacent side wall 31, the conveyor begins to rise in its path of travel, along a straight section 30 toward the opposite end 16 of the oven. At that end the conveyor passes about a first curved section 32 which may, be horizontal, or, alternatively, may also have an increasing pitch. After passing through 180°, the conveyor, which is now adjacent side Wall 33, enters another straight section 34, which again rises with a continuously increasing pitch of, e.g., 18" per straight run. When straight section 34 approaches end wall 14 it passes through another 180° curved section 36 to a position adjacent side wall 31 and then enters a straight section 38. That straight section is now 36" above straight section 30. Section 38 again rises at a pitch of 18", and as it approaches end wall 16 it enters another 180°, curved section 40. After passing again through 180°, it is again adjacent wall 33 and enters another straight section 42, located 36" above section 34. As the conveyor approaches end wall 14 it enters yet another curved section 44. This curved section represents the topmost flight of the conveyor. After passing through this curved section, the conveyor passes through a straight horizontal section 46 which runs along wall 31 to the opposite end 16 of the enclosure where it passes through a curved section 48. After passing through slightly more than 180° in the curved section 48, the conveyor is adjacent side wall 33 and begins to descend along a straight section 49 which crosses to the opposite side 31 of the enclosure in an S shape until it reaches a position between flight sections 46 and 38 and enters a curved section 50. There the conveyor passes through a 180° curve to side 33 and thence to a straight section 52 located between flight sections 34, 42. During passage through this straight section, the conveyor is descending at a substantially continous rate of about 18" over the length of the straight section between sections 34, 42 and in an opposite direction. At the end of the straight section 52 the conveyor enters another curved section 54, passes through 180° to a position adjacent side 31 and then to a straight section 56 which is located between flight sections 30, 38. The conveyor continues to move in a decreasing path in an opposite direction to sections 30, 38. Ultimately, the conveyor reaches the curved section 58 where it again passes through 180° and enters a straight section 60 forming the last descending straight section. At the end of the section 60 another 180° curve 62 is present, which leads to a straight horizontal section 64 that crossed over from side 31 to side 33 to complete the FIG. 8 pattern. At side 33 the conveyor enters the discharge section 65 thereof and passes out of the outlet opening 20 in the end wall 14 of the oven enclosure.

In accordance with an aspect of the invention, the conveyor arrangement can be modified so that the inlet and outlets are located at different elevations, whereby the bread pans can enter the oven at substantially any flight or level of the FIG. 8 layout, and leave at any level. For example, as illustrated in FIG. 5, instead of having the end curve 58, straight section 60, end curve 62 and straight section 64, the conveyor can be modified such that the inclined section 56 enters a straight section 66 at an elevation immediately above the inlet conveyor section 28, and passes out of an enlarged opening 18 above the inlet conveyor.

Of course, other modifications or variations in the location of the inlet and outlet conveyor sections would be apparent to those skilled in the art. For example, straight section 56 could be made to cross over the oven and exits along wall 33 at the level of curve 58 in FIG. 4.

As a result of this construction, the baking trays are rotated through 180° in relation to the oven walls during their path of travel. Thus, in contradistinction to previously proposed arrangements, such as noted in the above-identified patents, the right side of the baking pans as they enter the conveyor are not always moving adjacent the side walls of the oven enclosure, but are turned during their passage through the oven through 180° so that the left side is also, at times, facing or adjacent the side walls of the oven. This promotes a more uniform bake of the products in the baking trays within the ovens.

The mechanism for supplying heat to the oven can be constructed in any desired manner, such as disclosed for example in U.S. Pat. No. 4,631,029. In the illustrated embodiment, ribbon pipe gas burners are provided which are mounted to extend in the direction of travel under the straight conveyor sections. There can be two burners per straight section with each section or zone having a separate control system, as would be apparent to those skilled in the art. The products of combustion from the oven are withdrawn from the center top of the oven, as described for example in U.S. Pat. No. 4,608,961 or 4,631,029.

Although preferred embodiments of the invention have been described in connection with the accompanying drawings, it would be understood by those skilled in the art that various modifications and changes can be effected therein without departing from the scope or spirit of this invention.

What is claimed is:

1. A baking apparatus, comprising means forming a food conditioning enclosure having opposed end portions and opposed sides; a conveyor for food products adapted to convey such products into and out of said enclosure at a controlled rate of speed along a path of travel, said enclosure having conveyor inlet and outlet openings formed in at least one of said end portions at predetermined elevations therein; and said conveyor comprising an endless conveyor having a first straight inlet section which passes through said conveyor inlet opening, a riser section following a generally spiral shaped path of travel through a plurality of levels of increasing elevation to a predetermined level adjacent one side of the enclosure, a second straight section extending from said predetermined level at said one side of the enclosure in a generally straight declining path of travel to a predetermined elevation and position between levels of the riser section of the conveyor on the opposite side of the enclosure, a declining section located between the levels of said riser section and extending from said predetermined position to a lower position in the enclosure while generally continuously decreasing in elevation, and a final straight section leading from said declining section to said conveyor outlet opening of the enclosure whereby the position of pans on the conveyor relative to the side of the conveyor are reversed during travel in the riser and declining sections of the conveyor.

2. An apparatus as defined in claim 1, wherein said inlet and outlet openings are located on the same end of the enclosure.

3. An apparatus as defined in claim 2, wherein said inlet and outlet openings are located at the same predetermined elevation.

4. An apparatus as defined in claim 1, wherein said outlet opening is located at a lower elevation than said inlet opening.

5. An apparatus as defined in claim 4, wherein said outlet opening is located below said inlet opening.

6. An apparatus as defined in claim 3, wherein the conveyor includes a lower crossing section extending between said lower position of the declining section and said final straight section at a position adjacent said opposite side of the enclosure to said one side, thereby to complete a generally FIG. 8 path of travel.

7. A baking apparatus, comprising a food conditioning enclosure having opposed end and side portions and conveyor inlet and outlet openings formed therein, an endless conveyor including a first section located outside of the enclosure and having portions passing through said inlet and outlet openings, and a second, main portion located within said enclosure, said second, main portion of the conveyor including a first sequential set of flights having a generally continuously increasing elevation rising in the enclosure to a predetermined elevation, a second set of flights having a generally continuously decreasing elevation in the enclosure, with the flights of said second set being located between the flights of said first set, and a straight conveyor section connecting said first and second sets of flights at the uppermost elevations of said first and second sets of flights and crossing from one side of the enclosure to the other wherein the flights of said first and second sets have curved portions adjacent to the end portion of the enclosure and straight portions between said curves located along said side portions of the enclosure, said curved portion being horizontal and said straight portions of the flights being inclined.

8. A food processing apparatus as defined in claim 7, wherein said second set of flights includes a straight terminal end portion extending through said outlet opening to the first section of the conveyor.

9. Apparatus as defined in claim 8, wherein said inlet and outlet openings are located on the same end of the enclosure.

10. Apparatus as defined in claim 8, wherein said inlet and outlet openings are located at the same predetermined elevation.

11. Apparatus as defined in claim 8, wherein said outlet opening is located at a lower elevation than said inlet opening.

12. Apparatus as defined in claim 11, wherein said outlet opening is located below said inlet opening.

* * * * *